(12) United States Patent  (10) Patent No.: US 7,801,657 B2
Piyabongkarn et al.  (45) Date of Patent: Sep. 21, 2010

(54) STABILITY-ENHANCED TRACTION AND YAW CONTROL USING ELECTRONICALLY CONTROLLED LIMITED-SLIP DIFFERENTIAL

(75) Inventors: Damrongrit Piyabongkarn, Medina, MN (US); Jae Y. Lew, Shorewood, MN (US); John A. Grogg, LaOtto, IN (US); Robert J. Kyle, Battle Creek, MI (US)

(73) Assignee: Eaton Corporation, Cleveland, OH (US)

( * ) Notice: Subject to any disclaimer, the term of this patent is extended or adjusted under 35 U.S.C. 154(b) by 132 days.

(21) Appl. No.: 11/701,851

(22) Filed: Feb. 2, 2007

(65) Prior Publication Data

US 2007/0184929 A1  Aug. 9, 2007

Related U.S. Application Data

(60) Provisional application No. 60/765,046, filed on Feb. 3, 2006.

(51) Int. Cl.
*G05D 1/00* (2006.01)
*B60T 7/12* (2006.01)

(52) U.S. Cl. .................. 701/82; 701/1; 701/29; 701/53; 701/69; 701/84; 701/87; 701/88; 701/89; 701/90; 701/91; 180/6.64; 180/24.04; 180/24.09; 180/15; 180/65.235; 180/197; 180/201; 180/345; 180/119; 180/204; 180/205; 180/207; 180/234; 180/242; 180/243; 180/245; 180/246; 180/248; 180/249; 464/102; 464/103; 464/104; 464/110; 464/112; 464/113; 464/137; 464/139; 464/140; 464/147; 464/157; 464/15; 464/16; 464/25; 464/32; 464/34; 464/35; 464/37; 464/40; 464/41; 464/42; 464/45; 464/51; 464/55; 464/88; 464/905; 475/125; 475/126; 475/194; 475/195; 475/257; 475/266; 475/43; 475/94; 73/1.09; 73/114.11; 73/114.15; 73/131; 73/64.49; 73/862.08; 74/337; 74/5.47; 74/607; 74/819

(58) Field of Classification Search .............. 701/1, 701/69, 82, 53, 87, 91, 89, 29, 84, 88, 90; 180/15, 197, 201, 345, 119, 204, 234, 242–246, 180/6.64, 24.04, 24.09, 65.235, 205, 207, 180/248, 249; 116/36; 464/102, 103, 104, 464/11, 110, 112, 113, 137, 139, 140, 147, 464/15, 157, 16, 25, 32, 34, 35, 37, 40, 41, 464/42, 45, 51, 55, 88, 905; 475/125, 126, 475/194, 195, 257, 266, 43, 94; 73/1.09, 73/114.11, 114.15, 131, 64.49, 862.08; 74/337, 74/412, 5.47, 607, 819

See application file for complete search history.

(56) References Cited

U.S. PATENT DOCUMENTS

| | | | |
|---|---|---|---|
| 4,681,180 A * | 7/1987 | Oyama et al. | 180/76 |
| 4,790,404 A * | 12/1988 | Naito | 180/197 |
| 5,332,059 A * | 7/1994 | Shirakawa et al. | 180/197 |
| 5,388,658 A * | 2/1995 | Ando et al. | 180/197 |
| 5,417,298 A * | 5/1995 | Shibahata | 180/76 |
| 5,450,919 A * | 9/1995 | Shitani | 180/233 |
| 5,456,641 A * | 10/1995 | Sawase | 475/86 |
| 5,648,903 A * | 7/1997 | Liubakka | 701/41 |
| 5,745,862 A * | 4/1998 | Hirano | 701/1 |
| 5,748,474 A * | 5/1998 | Masuda et al. | 701/90 |
| 5,775,449 A * | 7/1998 | Moroto et al. | 180/65.235 |
| 5,806,617 A * | 9/1998 | Yamaguchi | 180/65.235 |
| 5,878,357 A * | 3/1999 | Sivashankar et al. | 701/1 |
| 5,910,064 A * | 6/1999 | Kuroki | 475/199 |
| 6,059,065 A * | 5/2000 | Takeda et al. | 180/244 |
| 6,145,614 A * | 11/2000 | Kimura et al. | 180/248 |
| 6,189,643 B1 * | 2/2001 | Takahashi et al. | 180/248 |
| 6,272,418 B1 * | 8/2001 | Shinmura et al. | 701/72 |
| 6,289,281 B1 * | 9/2001 | Shinmura et al. | 701/301 |
| 6,418,369 B2 * | 7/2002 | Matsumoto et al. | 701/80 |
| 6,453,226 B1 * | 9/2002 | Hac et al. | 701/48 |
| 6,549,840 B1 * | 4/2003 | Mikami et al. | 701/69 |
| 6,553,293 B1 * | 4/2003 | Hac | 701/42 |
| 6,564,139 B2 * | 5/2003 | Sakakiyama | 701/89 |
| 6,618,651 B1 * | 9/2003 | Tan | 701/1 |
| 6,692,396 B1 * | 2/2004 | Grogg et al. | 475/86 |
| 6,697,728 B2 * | 2/2004 | Kin et al. | 701/70 |
| 6,725,989 B1 * | 4/2004 | Krisher et al. | 192/35 |
| 6,733,411 B1 * | 5/2004 | Kaplan et al. | 475/88 |
| 6,752,233 B1 * | 6/2004 | Shakespear | 180/248 |
| 6,752,742 B2 * | 6/2004 | Shigeta et al. | 477/98 |
| 6,766,239 B2 * | 7/2004 | Barron et al. | 701/71 |
| 6,830,122 B2 * | 12/2004 | Kroppe | 180/197 |
| 6,895,317 B2 * | 5/2005 | Yasui et al. | 701/36 |
| 6,909,959 B2 * | 6/2005 | Hallowell | 701/88 |
| 6,922,617 B2 * | 7/2005 | Kogure et al. | 701/1 |
| 6,996,466 B2 * | 2/2006 | Bastian et al. | 701/69 |
| 7,004,870 B2 * | 2/2006 | Kroppe | 475/86 |
| 7,004,876 B2 * | 2/2006 | Puiu | 475/205 |
| 7,007,763 B2 * | 3/2006 | Ginther et al. | 180/6.2 |
| 7,044,880 B2 * | 5/2006 | Bowen | 475/205 |
| 7,059,990 B2 * | 6/2006 | Bowen | 475/201 |
| 7,059,991 B2 * | 6/2006 | Puiu | 475/201 |
| 7,059,992 B1 * | 6/2006 | Bowen | 475/205 |
| 7,175,557 B2 * | 2/2007 | Kirkwood et al. | 475/150 |
| 7,211,019 B2 * | 5/2007 | Kirkwood et al. | 475/205 |
| 7,229,139 B2 * | 6/2007 | Lu et al. | 303/140 |
| 7,233,236 B2 * | 6/2007 | Lu et al. | 340/440 |
| 7,263,424 B2 | 8/2007 | Motoyama | |
| 7,377,600 B2 * | 5/2008 | Motoyama | 303/142 |
| 7,610,980 B2 * | 11/2009 | Mori | 180/233 |
| 7,640,081 B2 * | 12/2009 | Lu et al. | 701/1 |
| 7,680,576 B2 * | 3/2010 | Nagura et al. | 701/69 |
| 2002/0107628 A1 * | 8/2002 | Sakakiyama | 701/89 |
| 2002/0143451 A1 * | 10/2002 | Hac et al. | 701/48 |
| 2003/0051560 A1 * | 3/2003 | Ono et al. | 73/862.08 |
| 2003/0163226 A1 * | 8/2003 | Tan | 701/1 |
| 2003/0191572 A1 * | 10/2003 | Roll et al. | 701/70 |
| 2003/0195667 A1 * | 10/2003 | Tange et al. | 701/1 |
| 2004/0035622 A1 * | 2/2004 | Ito et al. | 180/197 |
| 2004/0153228 A1 * | 8/2004 | Matsumoto et al. | 701/41 |
| 2004/0176899 A1 * | 9/2004 | Hallowell | 701/84 |
| 2005/0064993 A1 * | 3/2005 | Ginther et al. | 477/166 |
| 2005/0090943 A1 * | 4/2005 | Kogure et al. | 701/1 |
| 2005/0096826 A1 * | 5/2005 | Iwasaka et al. | 701/70 |
| 2005/0096827 A1 * | 5/2005 | Sadano et al. | 701/70 |
| 2005/0096828 A1 * | 5/2005 | Uemura et al. | 701/70 |
| 2005/0096829 A1 * | 5/2005 | Sugano et al. | 701/70 |
| 2005/0107939 A1 * | 5/2005 | Sadano et al. | 701/70 |
| 2005/0236894 A1 * | 10/2005 | Lu et al. | 303/139 |
| 2006/0015238 A1 * | 1/2006 | Motoyama | 701/71 |
| 2006/0167595 A1 * | 7/2006 | Breed et al. | 701/1 |
| 2007/0184929 A1 * | 8/2007 | Piyabongkarn et al. | 475/84 |

FOREIGN PATENT DOCUMENTS

| | | |
|---|---|---|
| DE | 19919969 | 11/2000 |
| EP | 1 473 204 A2 | 3/2004 |
| EP | 1334000 | 1/2005 |
| EP | 16161743 | 1/2006 |
| JP | 07052678 | 2/1995 |
| JP | 07329595 | 12/1995 |

OTHER PUBLICATIONS

PCT International Search Report dated Aug. 24, 2007 for International Patent Application No. PCT/IB2007/000242.

* cited by examiner

*Primary Examiner*—Khoi Tran
*Assistant Examiner*—Jorge O Peche
(74) *Attorney, Agent, or Firm*—Anna M. Shih

(57) ABSTRACT

A control system for a vehicle having first and second wheels is provided that includes a differential apparatus adapted to distribute torque between the first and second wheels and a traction controller for controlling operation of the differential apparatus from vehicle launch up to a predetermined vehicle speed. The traction controller is configured to engage the differential apparatus in a first operating state according to at least one vehicle operating parameter indicative of a low traction operating condition and to further control engagement of the differential apparatus in a second vehicle operating state during the low traction operating condition according to a difference between an actual vehicle yaw rate and a predetermined target vehicle yaw rate. The control system also includes a stability controller for controlling engagement of the differential apparatus at or above the predetermined vehicle speed.

3 Claims, 13 Drawing Sheets

STABILITY-ENHANCED TRACTION AND YAW CONTROL USING ELECTRONICALLY CONTROLLED LIMITED-SLIP DIFFERENTIAL

CROSS-REFERENCE TO RELATED APPLICATIONS

This application claims the benefit of Provisional Patent Application U.S. Ser. No. 60/765,046, filed Feb. 3, 2006, in the name of Damrongrit Piyabongkarn, Jae Young Lew, John Allen Grogg and Robert Joseph Kyle for a "STABILITY-ENHANCED TRACTION AND YAW CONTROL USING ELECTRONIC LIMITED SLIP DIFFERENTIAL".

BACKGROUND OF THE DISCLOSURE

The present invention relates to an active vehicle stability control system and method using electronically controlled limited-slip differentials to enhance vehicle lateral dynamics while preserving longitudinal motion.

Anti-lock braking systems (ABS) have become an integral part of modern passenger vehicles and may be used to improve vehicle traction and stability. Typical traction control systems based on brake intervention have the disadvantage of dissipating an amount of energy roughly equal to that spent in biasing the high-friction wheel. For example, when a vehicle attempts to accelerate or climb on a split-friction (split-μ), low-high friction surface, it often loses its energy to the braking system by dissipating the same amount of energy it biases to the high-friction wheel. Hence, the braking torque limits the driving torque on the high-friction wheel and is often insufficient to move the vehicle, such as in an uphill-driving situation.

To overcome this limitation, traction control using electronically controlled limited-slip differentials (ELSDs) may be applied at the driven wheels so that the vehicle can maintain longitudinal motion by sending more traction torque to the higher friction wheel. Fully locked differentials achieve the best possible longitudinal traction but, on slippery or split-μ surfaces, the lateral dynamics of the vehicle may be degraded and deviate from the driver's intended direction. Indeed, the bias traction torque must be properly controlled to prevent undesired yaw motion and eventual degradation of the lateral dynamics of the vehicle.

At relatively high speeds, yaw stability control systems may be applied to prevent the vehicle from losing control. Most vehicle stability control systems in the market are brake-based. Brake-based stability control systems use ABS hardware to apply individual wheel braking forces in order to correct vehicle yaw dynamics. However, brake-based systems suffer from the limitation that the speed performance of vehicle is deteriorated and conflicts with the driver's actions. To overcome the brake-based stability control limitation, the use of active torque distribution stability control would be more beneficial under acceleration close to the vehicle's stability limit.

The last two decades have witnessed significant growth in the application of four-wheel-drive (4WD) systems to passenger vehicles. Limited-slip differential (LSD) technology is already being used in many production models. ELSDs are widely used and available in the automotive market, and are known to have the capability of adding yaw damping to the vehicle in addition to their superior traction performance.

BRIEF SUMMARY OF THE INVENTION

A control system for a vehicle having first and second wheels is provided that includes a differential apparatus adapted to distribute torque between the first and second wheels and a traction controller for controlling operation of the differential apparatus from vehicle launch up to a predetermined vehicle speed. The traction controller is configured to engage the differential apparatus in a first vehicle operating state according to at least one vehicle operating parameter indicative of a low traction operating condition and to further control engagement of the differential apparatus in a second vehicle operating state during the low traction operating condition according to a difference between an actual vehicle yaw rate and a predetermined target vehicle yaw rate. The control system also includes a stability controller for controlling engagement of the differential apparatus at or above the predetermined vehicle speed.

An embodiment of the present invention includes an active stability control method using ELSDs to enhance the vehicle lateral dynamics while preserving longitudinal motion. Another embodiment of the present invention includes a control system that provides stability enhancement of the traction control. The stability-enhanced traction control was evaluated under the condition of straight-line full-throttle launching on a split-μ ice/asphalt surface. The experimental data shows a significant stability improvement in the traction control operating mode.

DETAILED DESCRIPTION

The present invention will be described as follows. First, an exemplary vehicle driveline configuration using an electronically controlled limited-slip differential will be introduced. Second, modeling of a limited-slip differential is analyzed. Third, a stability control system is described for both traction control and yaw control. Finally, simulation and experimental results will illustrate the effectiveness of the control system to control vehicle stability during launch and relatively high-speed operation.

Figure 1:
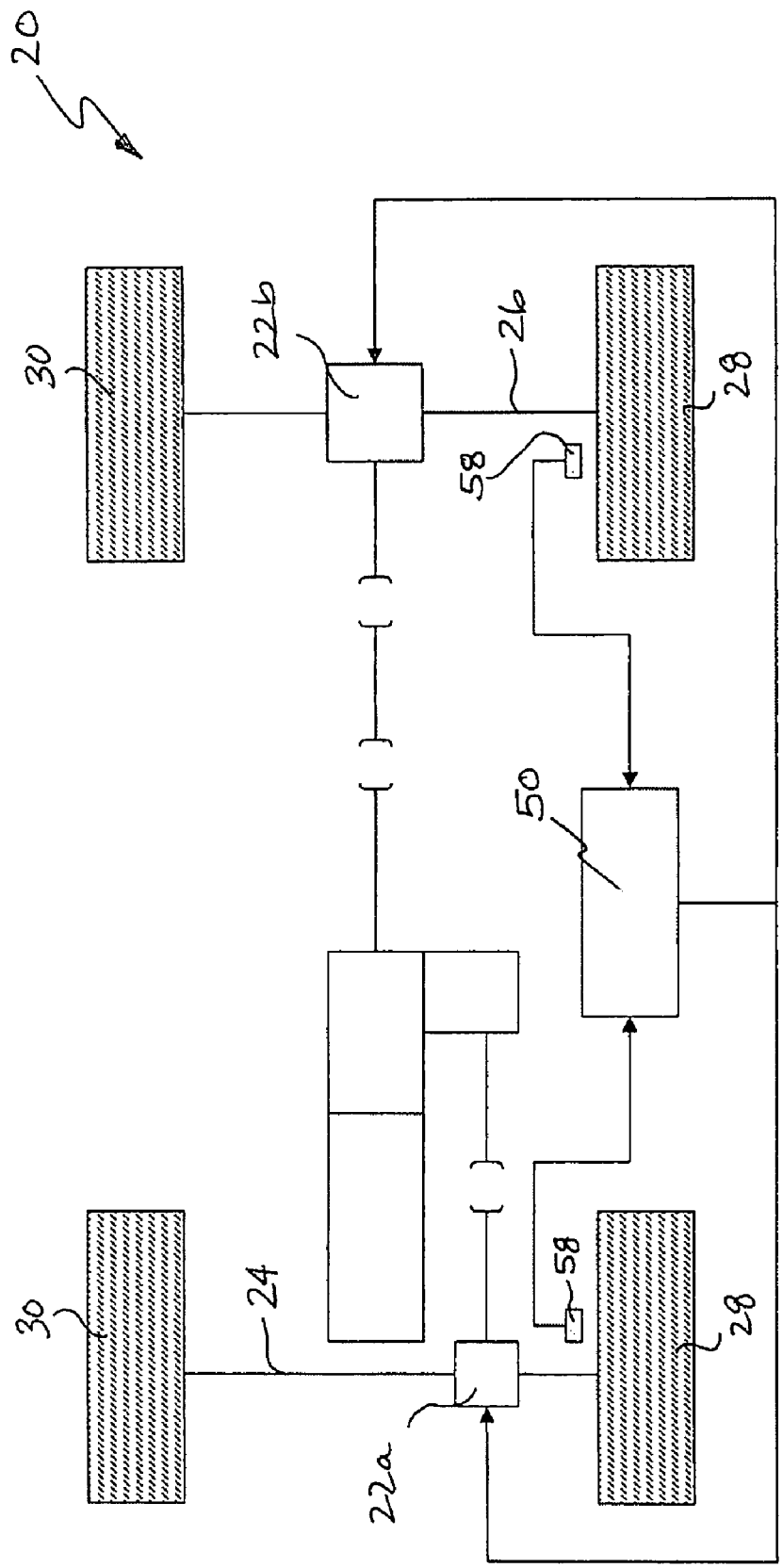
FIG. 1 is an exemplary vehicle driveline configuration including an electronically controlled limited-slip differentials.

Referring to FIG. 1, a proposed driveline configuration 20 is shown, which is not intended to be limiting. Driveline 20 includes an electronically controlled limited-slip differential (ELSD) 22a, 22b installed in at least one of a front axle 24 and a rear axle 26. The ELSD 22 may be used to bias torque between left and right wheels 28, 30. In an embodiment, the amount of torque distributed between the left and right wheels 28, 30 by the ELSD 22 is determined by engagement of a clutch (not shown), as is understood in the art, which may be implemented by either a hydraulic or an electromagnetic system, for example. Exemplary ELSDs for use in driveline 20 are described in pending U.S. patent application Ser. No. 11/167,474 and issued U.S. Pat. No. 7,051,857, which are assigned to the Assignee of the present invention and incorporated by reference herein in their entirety.

Figure 2:
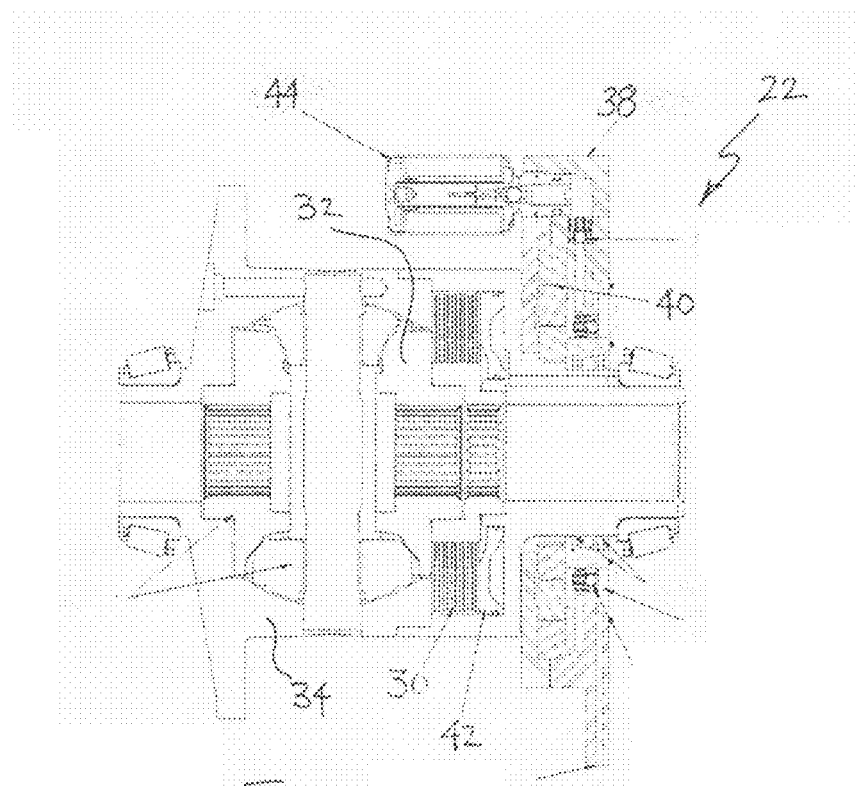
FIG. 2 is a cross-sectional view of an exemplary electronically controlled limited-slip differential.

As shown in FIG. 2, and by way of reference to the aforementioned references, an ELSD utilized in the front and rear axles 24, 26 achieves its limited slip functionality by virtue of an actively controlled wet, multi-plate friction clutch 30 disposed between a first bevel-style side gear 32 and a differential housing 34. Engagement of clutch 30 limits the slip between the side gear 32 and differential housing 34, and in doing so, limits the slip between a pair of output axle shafts (not shown) connected to each wheel 28, 30. This slip limiting function results in the ability to produce a torque bias between the output axle shafts, the magnitude of which will be less than or equal to the clutch torque. Exemplary features, such as a relatively high locking torque level, thermal capacity, durability, and noise free operation epitomize this clutch design. Rotational motion between the differential housing 34 and a secondary housing 38 operates a gerotor pump 40 that displaces oil from an axle sump to a discharge passage in direct communication with both a clutch actuation piston 42 and a solenoid operated pressure regulation valve 44. When the valve 44 is de-energized, oil flows freely through the valve 44 resulting in little or no hydraulic pressure against the clutch actuation piston 42. When the valve 44 is energized, oil flow is restricted by the valve 44 creating hydraulic pressure against the actuation piston 42 to engage the clutch 30 according to a level proportional to that of the hydraulic pressure.

Hydraulic system optimization is an essential design component of an ELSD and at the core of this optimization is proper pump design and porting control. The gerotor pump 40 in the exemplary ELSD design shown in FIG. 2 is operated with a high degree of hydraulic efficiency required for excellent low speed (e.g., less than 32 kilometers per hour (kph)) traction control, while not unduly penalizing the mechanical efficiency at higher vehicle speeds (e.g., greater than around 113 kph). Highway speed fuel economy measurements obtained from a test vehicle incorporating an ELSD design described above revealed no measurable reduction in fuel economy. Similarly, laboratory bench testing of the exemplary differential shown in FIG. 2 exhibited a power loss of approximately 0.11 kW at about 113 kph due to the mechanical losses of the pump 40.

Figure 3:
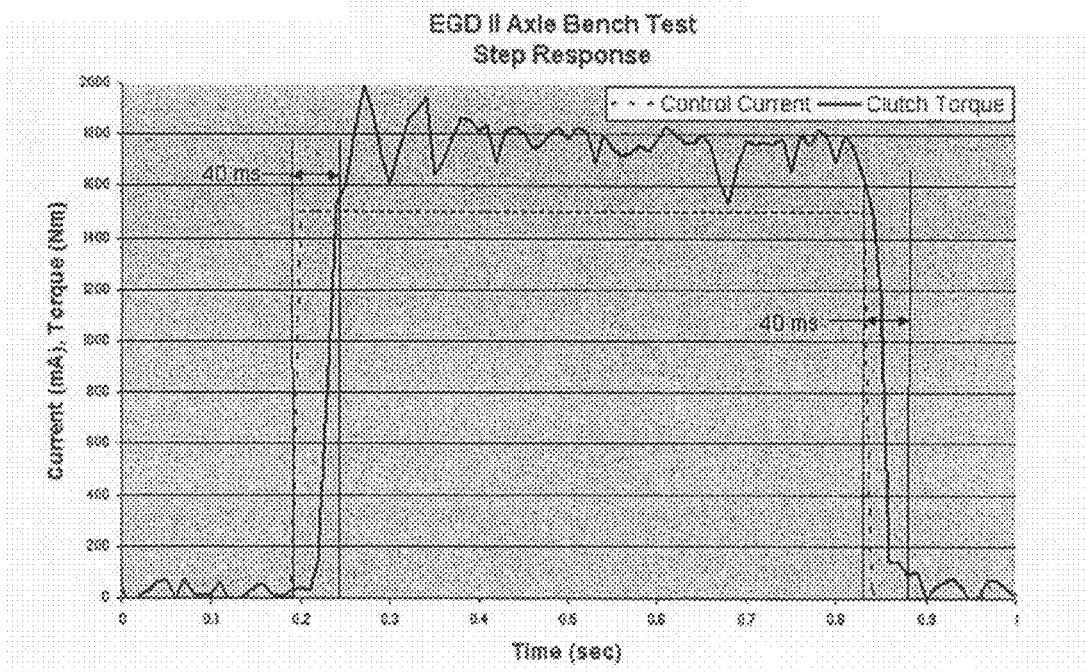
FIG. 3 is a plot of clutch response time for the exemplary electronically controlled limited-slip differential shown in FIG. 2.

Regardless of the mechanical construction of either ELSD 22, the clutch response time needs to be sufficient to guarantee the effectiveness of the stability control system. The ELSD design shown in FIG. 2 requires minimal electrical current draw for rapid peak torque development, for example 2000 Nm of torque using 2.67 Amps (32 W) of electrical current, particularly when compared to that of other systems that use electromagnetic or electric-motor based actuators. Relatively fast differential torque bias application and removal is required for both driveline torque control based vehicle dynamic operation (as described herein), and also for compatibility with many of the current brake-based vehicle dynamic intervention systems. FIG. 3 illustrates a plot of step torque bias application and removal performed with the exemplary ELSD described herein. As illustrated, both the clutch engagement and disengagement times are less than 50 ms for a vehicle traveling at about 64 kph.

Figure 4:
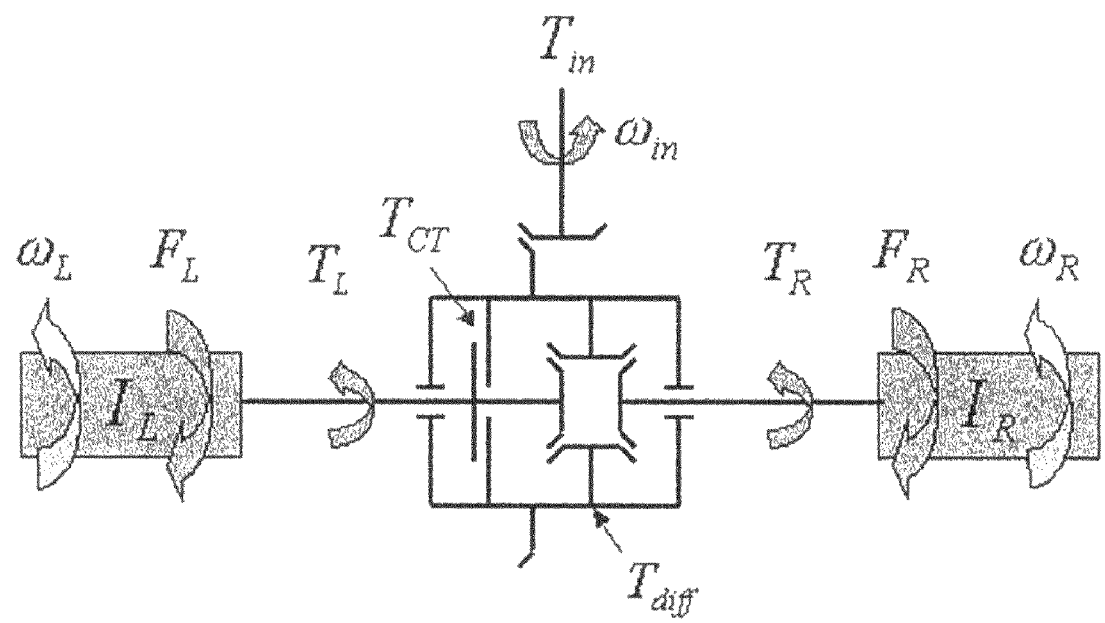
FIG. 4 is a dynamic model of a vehicle axle including an electronically controlled limited-slip differential.
Figure 5:
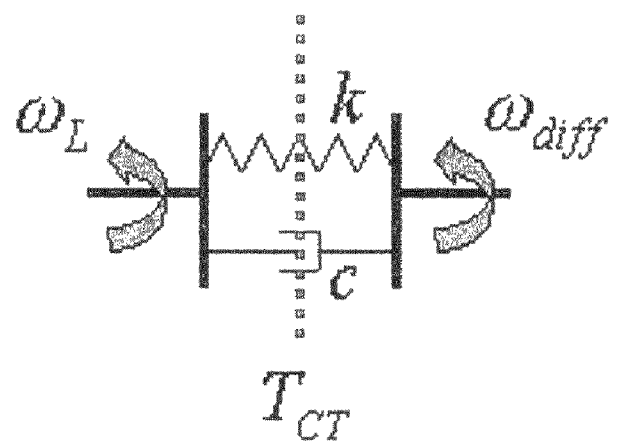
FIG. 5 is a dynamic model of an electronically controlled limited-slip differential clutch.

Referring to FIGS. 4 and 5, a dynamic model of an ELSD will be described for vehicle control system evaluation. The model is based on the dynamic properties of the clutch and focuses on locking and unlocking (or slipping) clutch conditions, including the conditions for transitioning clutch engagement between an unlocked/slipping state and a locked state.

An ELSD generally has the same components as an open differential, except for a clutch that provides an additional path for torque transfer. Referring to FIG. 4, $T_{in}$ is the torque transferred to the rear prop-shaft, $T_{diff}$ is the torque transferred through the differential gears, and $T_{CT}$ is the torque transferred through the clutch. $T_{CT}$ is not necessary the same as the applied clutch torque level controlled by the vehicle electronic control unit (ECU) or other controller, depending on locked, unlock, or slipping states. Assuming that the efficiency of the torque transmission is 100%, the differential gear ratio from the prop-shaft to the differential is 1, and the differential has little or no mass inertia, then:

$$T_{in} = T_{CT} + T_{diff} \tag{1}$$

Since torque transferred through the differential gears $T_{diff}$ is equally distributed to the left and right axle, the net torque to the rear-left inertia and the rear-right inertia may be expressed as:

$$T_L = T_{CT} + \frac{T_{diff}}{2} \tag{2}$$

$$T_R = \frac{T_{diff}}{2} \tag{3}$$

Referring to FIG. 5, the clutch may be modeled as a spring-damper torsional element according to the following equation:

$$T_{CT} = c \cdot \Delta\omega + \int k \cdot \Delta\omega \cdot dt \tag{4}$$

wherein c is the clutch damping coefficient, k is the clutch spring coefficient, and $\Delta\omega = \omega_{diff} - \omega_L$ which represents the difference in speed between the differential and the left axle.

The clutch may be further modeled in the locking state. $T_{CT\_max}$ represents the clutch torque applied to the clutch plates and controlled by the vehicle controller. However, depending on the locking state, the actual transferred clutch torque is not necessary the same as the applied clutch torque level. In fact, the transferred clutch torque may be limited by $T_{CT\_max}$ as follows:

$$T_{CT} = \underset{T_{CT\_max}}{sat} \left\{ c \cdot \Delta\omega + \int k \cdot \Delta\omega dt \right\} \quad (5)$$

The locking conditions for the limited-slip differential are modeled as follows. Transition from the locked state to the unlocked/slipping state occurs when:

$$c \cdot \Delta\omega + \int k \cdot \Delta\omega dt = T_{CT\_max}$$

The modeling for this condition may be derived from equations (2) and (3) as:

$$T_L = \frac{T_{in} + T_{CT\_max} \cdot sgn(\Delta\omega)}{2} \quad (6)$$

$$T_R = \frac{T_{in} - T_{CT\_max} \cdot sgn(\Delta\omega)}{2} \quad (7)$$

Transition from the unlocked/slipping state to the locked state occurs when:

$$c \cdot \Delta\omega + \int k \cdot \Delta\omega dt < T_{CT\_max}.$$

This model represents the situation where the applied clutch torque is larger than the torque difference between the clutch plates and, accordingly, describes the locking dynamics of the clutch.

From equations (1) and (4), $T_{diff}$ is calculated as:

$$T_{diff} = T_{in} - T_{CT} = T_{in} - (c \cdot \Delta\omega + \int k \cdot \Delta\omega dt) \quad (8)$$

Then:

$$T_L = T_{CT} + \frac{T_{diff}}{2} = \frac{T_{in} + \left(c \cdot \Delta\omega + \int k \cdot \Delta\omega dt\right)}{2} \quad (9)$$

$$T_R = \frac{T_{diff}}{2} = \frac{T_{in} - \left(c \cdot \Delta\omega + \int k \cdot \Delta\omega dt\right)}{2} \quad (10)$$

Taking the derivative of the above equations yields:

$$\dot{T}_L = \frac{1}{2}\left(\dot{T}_{in} + c \cdot \Delta\dot{\omega} + k \cdot \Delta\omega\right) \quad (11)$$

$$\dot{T}_R = \frac{1}{2}\left(\dot{T}_{in} - c \cdot \Delta\dot{\omega} - k \cdot \Delta\omega\right) \quad (12)$$

wherein $\Delta\dot{\omega} = \dot{\omega}_{diff} - \dot{\omega}_L$.

Dynamic equations of the rear left and rear right shafts are derived as follows:

$$I_L \dot{\omega}_L = T_L - r_{eff} F_L \quad (13)$$

$$I_R \dot{\omega}_R = T_R - r_{eff} F_R \quad (14)$$

In addition, according to the physical principles of a differential, differential speed is determined as follows:

$$\omega_{diff}(=\omega_{in}) = \frac{\omega_L + \omega_R}{2} \text{ or} \quad (15)$$

$$\dot{\omega}_{diff} = \frac{\dot{\omega}_L + \dot{\omega}_R}{2}$$

Substituting equations (13) and (14) into (15), yields:

$$\Delta\dot{\omega} = -\frac{T_L - r_{eff} F_L}{2 I_L} + \frac{T_R - r_{eff} F_R}{2 I_R} \quad (16)$$

by noting that $2\Delta\dot{\omega} = 2(\dot{\omega}_{diff} - \dot{\omega}_L) = \dot{\omega}_L - \dot{\omega}_R$.

Utilizing the above transition conditions, the dynamics of the torque-biasing devices may be implemented in simulation software, such as Matlab/Simulink. The discrete-time modeling of both devices is summarized below.

When changing from the locked state to the unlocked/slipping state, then:

$$T_L(n) = \frac{T_{in}(n) + T_{CT\_max}(n) \cdot sgn(\Delta\omega(n))}{2} \quad (17)$$

$$T_R(n) = \frac{T_{in}(n) - T_{CT\_max}(n) \cdot sgn(\Delta\omega(n))}{2} \quad (18)$$

When changing from the unlocked/slipping state to the locked state, then:

$$T_L(n+1) = T_L(n) + \frac{T_{in}(n+1)}{2} - \frac{T_{in}(n)}{2} + \frac{k \cdot \delta t}{2} \cdot \Delta\omega(n) + \frac{c \cdot \delta t}{2} \cdot \Delta\dot{\omega}(n) \quad (19)$$

$$T_R(n+1) = \quad (20)$$
$$T_R(n) + \frac{T_{in}(n+1)}{2} - \frac{T_{in}(n)}{2} - \frac{k \cdot \delta t}{2} \cdot \Delta\omega(n) - \frac{c \cdot \delta t}{2} \cdot \Delta\dot{\omega}(n)$$

While torque distribution though the ELSD may be used to change vehicle tractive forces at the wheels, consequently the dynamic yaw response of the vehicles changes. Application or engagement of the clutch 30 may be adjusted to tune the desired vehicle yaw dynamics behavior for specific driving conditions.

Figure 6:
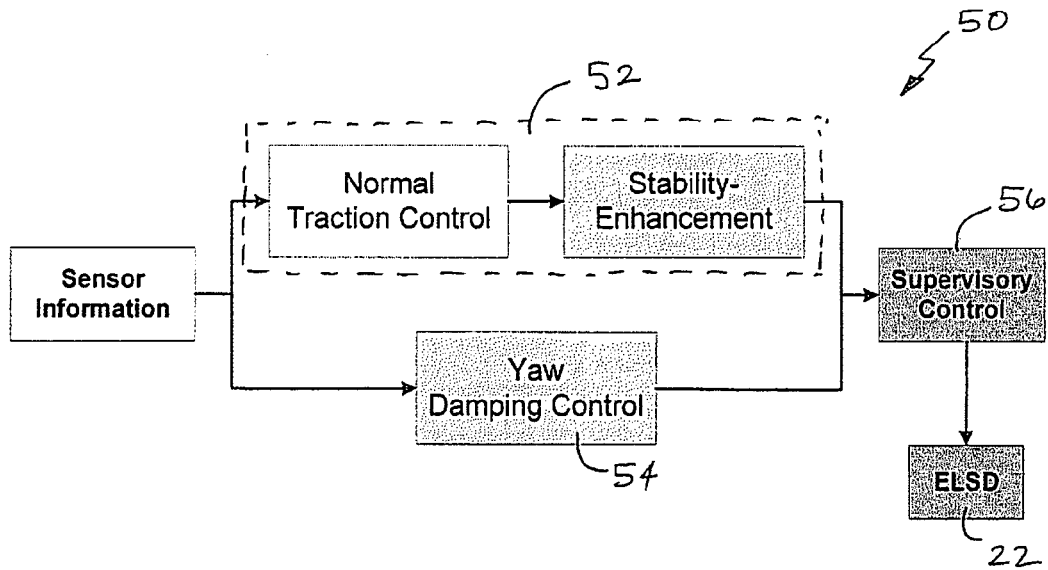
FIG. 6 is schematic diagram of a control system according to an embodiment of the present invention.

Referring to FIG. 6, a vehicle control system 50, including a method of improving vehicle stability using torque biasing according to an embodiment of the present invention, will be described. In an embodiment, the control system 50 includes two primary controllers: a stability-enhanced traction controller 52 and a yaw damping controller 54. A supervisory controller 56 may be used to select the control actions in accordance with one or more vehicle operating parameters, such as vehicle speed, as determined by vehicle sensor information received from one or more vehicle sensors 58. At relatively low vehicle speeds, a stability-enhanced traction control algorithm is applied to improve the vehicle stability while the traction control is active. At relatively high vehicle speeds, the stability-enhanced traction control is switched off and only the yaw damping control is active. Traction controller 52 and yaw damping controller 54 may be provided in communication with or be contained within a separate control unit, such as a vehicle electronic control unit (ECU), made integral within the vehicle ECU or with each other, or form a non-hardware component (e.g., software) of the vehicle ECU or other vehicle controller.

Traction control systems utilizing actively controlled, fully lockable differentials generally achieve the best possible longitudinal vehicle acceleration, but degrade a vehicle's lateral dynamics under a split-μ condition. More particularly, while a conventional differential-controlled traction control system may be capable of controlling the differential clutch in real-time based on the feedback of wheel slip information, the system may create yaw instability due to over-application of the clutch.

The vehicle stability control system according to an embodiment of the present invention overcomes this limitation by providing an enhanced-stability traction control controller in addition to the normal active traction controller. In stability-enhanced traction controller 52, it is determined whether the actual vehicle yaw rate exceeds a predetermined desired yaw rate, as follows:

$$\Delta r = r - r_{des} \quad (21)$$

wherein r is the actual-yaw rate, and $r_{des}$ is the desired yaw rate:

$$r_{des} = \frac{V_x}{L\left(1 + \frac{K_{us}V_x^2}{gL}\right)} \delta \quad (22)$$

wherein $V_x$ is the vehicle longitudinal speed, δ is the steered angle, L is the vehicle wheel base, and $K_{us}$ is the understeer gradient.

Whenever the actual vehicle yaw rate exceeds a predetermined desired yaw rate, the differential clutch is disengaged proportional to the difference between the actual and desired yaw rates, allowing the vehicle driver to turn the vehicle back on track. The stability-enhanced traction control is implemented by modifying the original or normal differential applied torque according to the following equation:

$$u = u_{traction} \cdot \left(\frac{a - |sat_{\pm a}[deadband_{\pm th}(\Delta r)]|}{a}\right) \quad (23)$$

wherein u is the differential applied torque; $u_{traction}$ is the original traction control signal; deadband is a threshold function for the yaw rate difference which can be adjusted based on the driver skill of controlling a vehicle; sat is a saturation function set at [−a,+a]; and a is an error range value which is a design parameter.

In addition to improving stability in a low-traction straight-line vehicle operation, the vehicle stability control system may also contribute to increased stability while the vehicle is cornering. When the stability enhanced traction control function is complete, the ELSD may still be used to bias the prop-shaft torque between the left and right vehicle wheels. If the differential clutch torque is applied while the vehicle is turning, the device only transfers driving torque from the outside wheel to the inside wheel, thus generating a yaw moment in opposite direction of the turn and increasing the understeer tendency of the vehicle. This phenomenon may be explained by considering equations (19) and (20). The speed of the outside wheel is normally larger than the speed of the inside wheel while turning. Application of the differential clutch will attempt to bring the speeds of both outside wheel and inside wheel to the same value. The outside wheel speed and acceleration will be reduced, along with the driving torque, and vice versa, while the driving torque at the inner wheel will be increased. Hence, the control strategy is based on the principle that locking the ELSD induces more understeering behavior.

The yaw damping controller 54 locks the differentials to increase yaw damping when the actual yaw rate is larger than a predetermined desired yaw rate. As described above, the desired yaw rate may be determined based on vehicle speed and steering wheel angle. The actual yaw rate may then be compared to the desired yaw rate in real time. If the actual yaw rate is less than the desired yaw rate, the differentials are not further engaged since increasing the locking torque on the front and rear differentials increases yaw damping, thereby reducing the yaw rate. The yaw rate comparison may not be active when the lateral acceleration is below 0.03 g and yaw rate variation between the actual and desired yaw rates is less than 3%. Differential applied torque to be applied by yaw damping controller 54 may be determined according to the following equation:

$$u = \left(K_p + \frac{K_i}{s}\right) \cdot pos(deadband_{\pm th}((r - r_{des}) \cdot sgn(r))) \quad (24)$$

wherein u is the differential applied torque, deadband is a threshold function for the yaw rate difference which can be adjusted based on sensitivity of the control system, $K_p$ and $K_i$ are a proportional gain and an integral gain, respectively, and pos is a positive value function. Yaw damping controller 54 engages the ELSD whenever there is too much yaw rate overshoot under a constant-μ condition. Operation of yaw damping controller 54 is described in more detail in Applicant's co-pending U.S. patent application entitled "Minimizing Dynamic Rollover Propensity with Electronic Limited Slip Differentials," which is incorporated by reference herein in its entirety.

Figure 7:
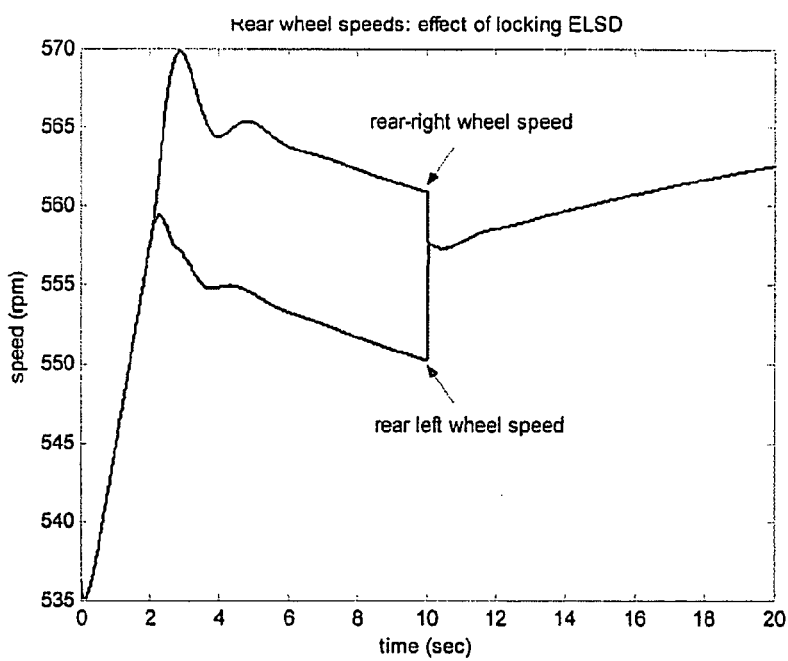
FIG. 7 is a plot showing the effect of locking an electronically controlled limited-slip differential on the rear wheels of a vehicle axle.

A dynamic model of control system 50 was generated in a Matlab/Simulink environment. A full vehicle model developed by CarSim was used and modified to include the exemplary ELSDs described above so that a co-simulation could be performed. FIG. 7 shows the validation of the developed model. When a high clutch torque was applied for a turning maneuver, the speeds of the left wheel and the right wheel became substantially similar within the engagement time.

To evaluate the performance of the proposed control system 50 operating under the control of yaw damping controller 54, a standardized double lane-change maneuver was simulated to validate the effects of the proposed yaw control on vehicle dynamics. This maneuver was performed to evaluate yaw-damping performance in rear-wheel-drive mode. All conditions were set to the same speed of 100 km/h on a relatively slippery road (μ=0.6).

Figure 8:
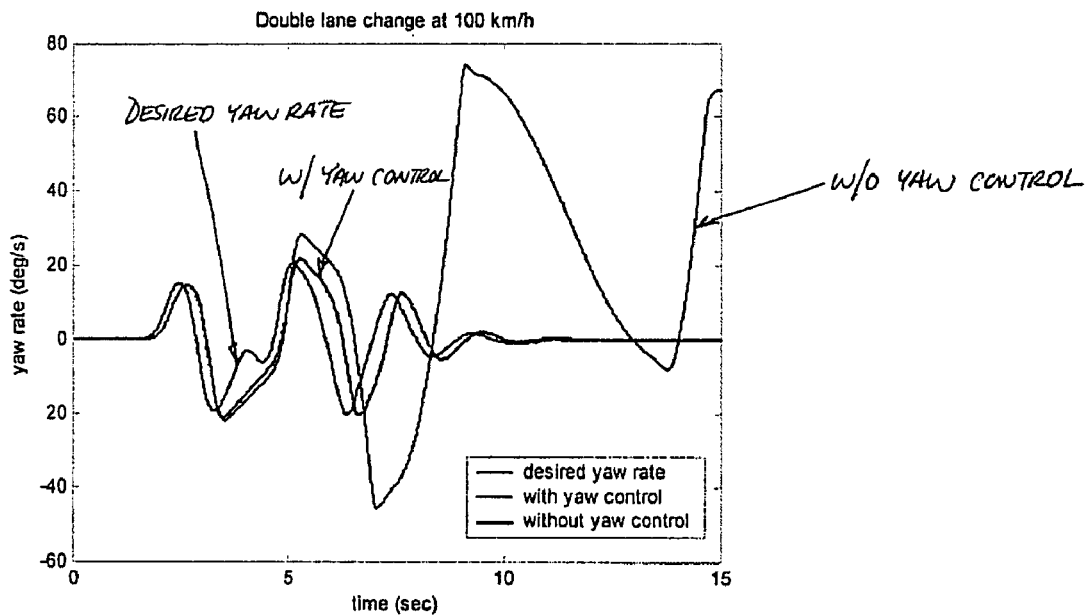
FIG. 8 is a plot of vehicle yaw rate for a double lane change maneuver in a vehicle including a control system according to an embodiment of the present invention.
Figure 9:
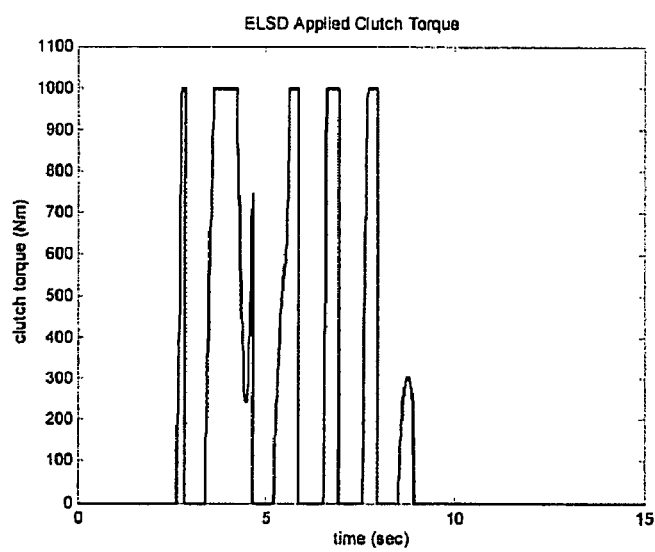
FIG. 9 is a plot of clutch torque for an electronically controlled limited-slip differential corresponding to the plot of FIG. 8.
Figure 10:
FIG. 10 is a composite snap-shot of a vehicle animation run corresponding to the plot of FIG. 8.

FIG. 8 illustrates the comparison of a vehicle with and without yaw damping control. The vehicle with yaw damping control has superior performance and stability compared to the vehicle without yaw damping control, which eventually became unstable. FIG. 9 indicates the corresponding clutch torque levels that were used to control the torque-biasing devices. The ELSD clutch was activated only when the vehicle was oversteering. Finally, FIG. 10 shows a snap shot of an animation run in CarSim.

Vehicle testing was conducted on a modified Ford F-150 equipped with Eaton Corporation's EGerodisc™ differential in both the front axle and rear axle, and a modified Chevrolet Silverado equipped with Eaton Corporation's EGerodisc II™ differential in the rear axle. To obtain objective test results, the vehicles were instrumented to record the relevant operating parameters. A MicroAutoBox from dSPACE was used to develop a real-time controller for the vehicles, providing a rapid prototyping environment in Matlab/Simulink. The controller was designed as an in-vehicle unit, similar to a vehicle ECU, and the sampling time was set at 10 ms. ControlDesk experiment software from dSPACE was used to manage, monitor and record the experimental data through a graphic user interface mode (GUI).

A real-time vehicle navigation system, RT3000, from Oxford Technical Solutions was also used for the test. The RT3000 is a full, six-axis inertial navigation system with combined GPS. The GPS outputs were connected to the MicroAutoBox via the vehicle's CAN communication at the baud rate of 0.5 Mbits/sec. The sensor information used in the stability test included wheel speed sensors, a steering angle sensor, and RT3000 signals (e.g., vehicle speed, global X, global Y, lateral acceleration, longitudinal acceleration, body slip angle and yaw rate).

Figure 11:
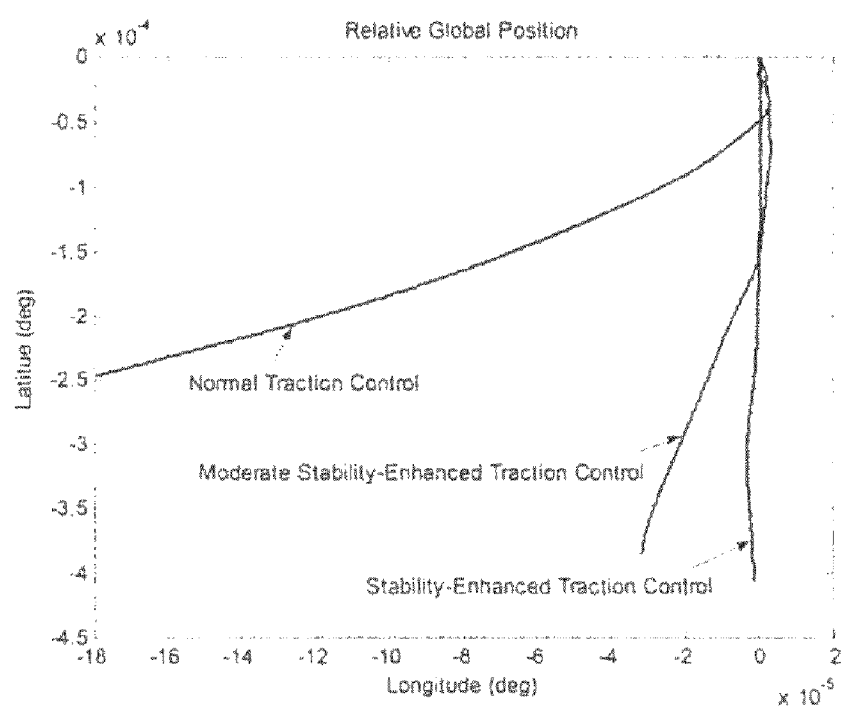
FIGS. 11-13 illustrate test results, in graphical format, of vehicle performance during launch using a control system according to an embodiment of the present invention.
Figure 12:
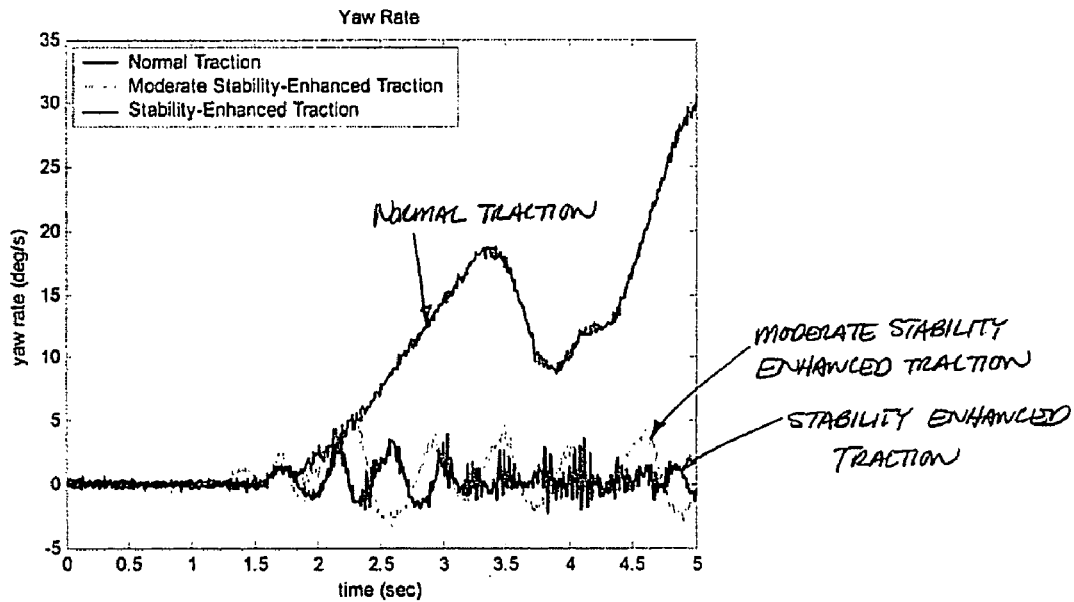
Figure 13:
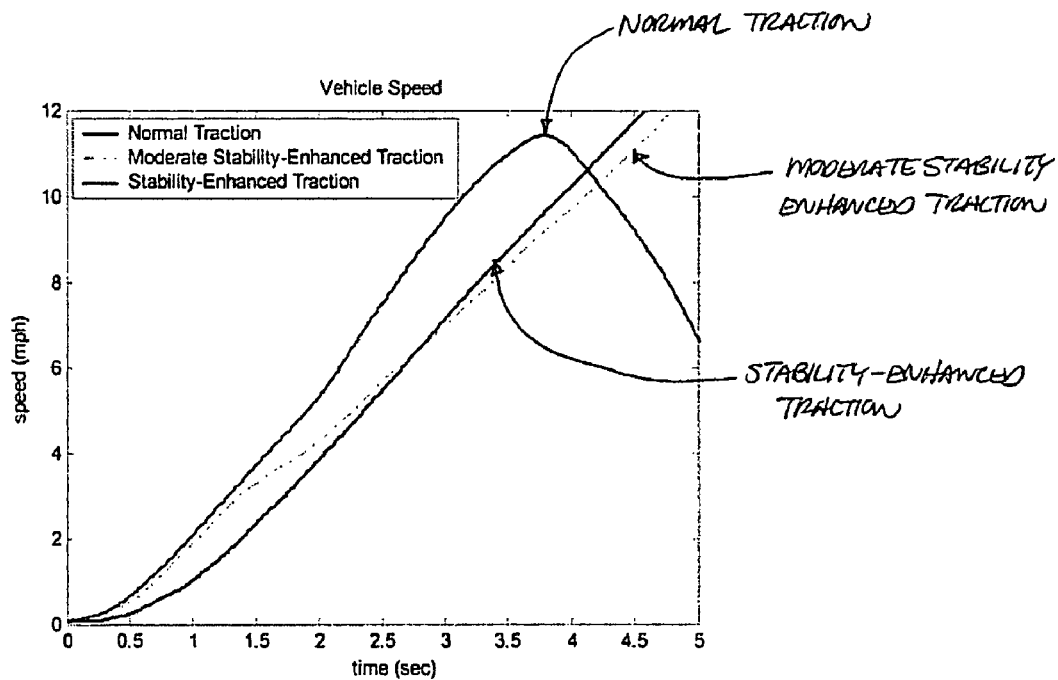

The stability-enhanced traction control test was conducted using a straight-line full-throttle vehicle launch on a split-μdry and icy surface. The steering wheel angle was set to zero during the duration of the test (e.g., open-loop) for objective validation. The yaw error in the deadband function in equation (23) was set to ±0.5 deg/sec. The error range value, a, was set to 0.5 deg/sec for this test. As shown in FIGS. 11-13, the experimental data demonstrated a significant improvement in vehicle stability during vehicle launch in the stability-enhanced traction control mode. The vehicle spun-out quickly toward the icy portion of the road surface when operated solely using the normal traction control mode. With the stability-enhanced traction control, the vehicle yaw dynamics were stable and the vehicle maintained a substantially straight heading. Minimum undesired yaw was achieved with low deadband threshold, but the vehicle was launched slower. The deadband, however, can be adjusted based on driver skill.

Above a predetermined vehicle speed, as determined by vehicle sensors such as the wheel speed sensors, the yaw damping controller becomes active. Slalom maneuvers, in particular, may create an unstable vehicle situation. Oversteering behavior can be observed under a low-μ surface slalom maneuver; hence, a slalom maneuver was selected to evaluate the active yaw control. The course used seven cones in a straight line with about 100 feet of separation on a packed-snow surface. A driver then drove the vehicle up to a speed of about 50 km/h, before getting into the slalom course.

Figure 14:
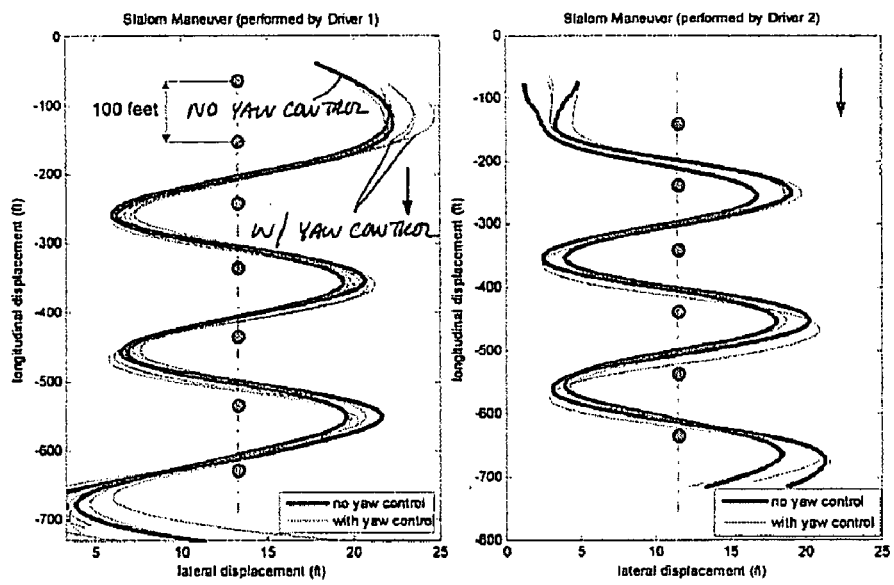
FIGS. 14-22 illustrate test results, in graphical format, of vehicle performance during a relatively high-speed slalom maneuver using a control system according to an embodiment of the present invention.
Figure 15:
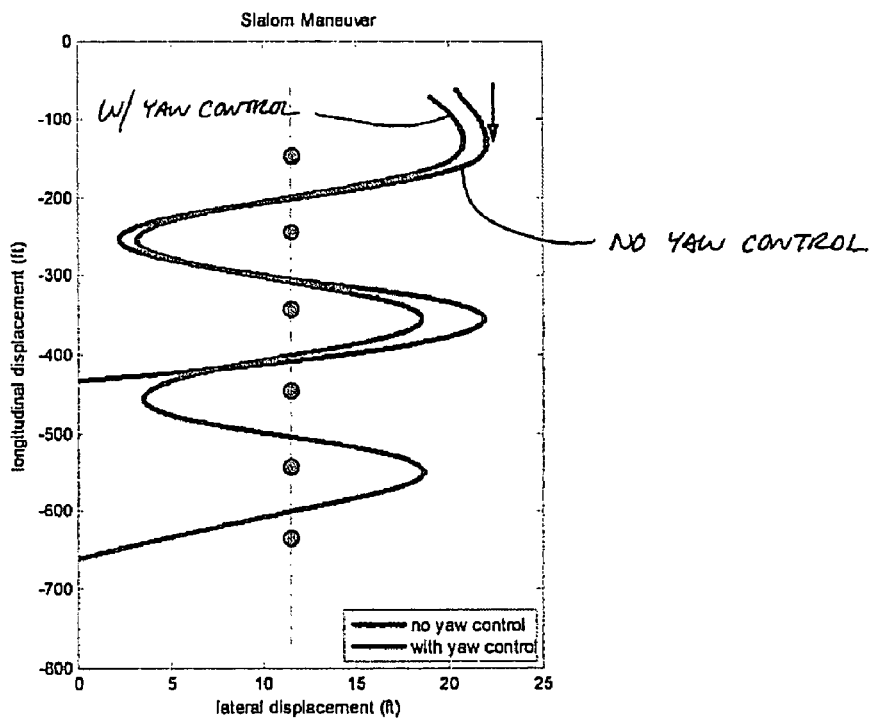

Referring to FIGS. 14-24, the experimental results show that active control of the vehicle differential improves vehicle dynamics during the slalom maneuvers. However, if the vehicle is not driven up to the handling limit, it is difficult to distinguish the difference between the systems with and without yaw control, as shown in FIG. 14. It is noted that driver skill has a significant influence on the performance when the vehicle is not driven at the handling limit.

Figure 16:
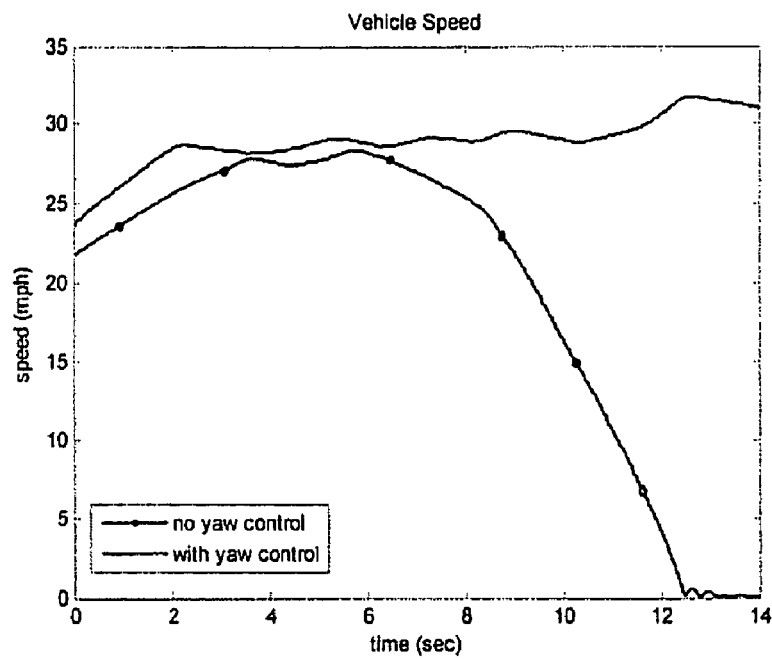
Figure 17:
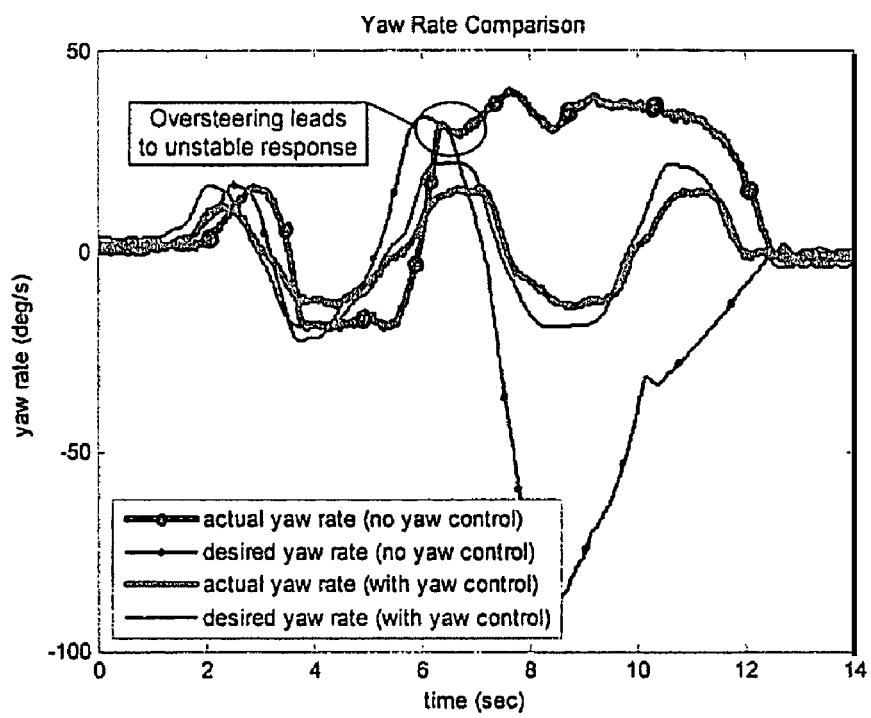
Figure 18:
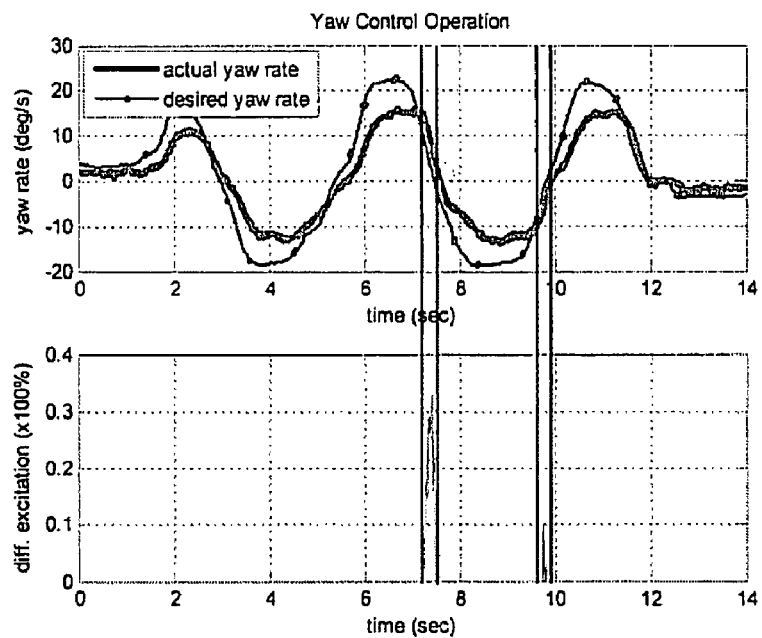
Figure 19:
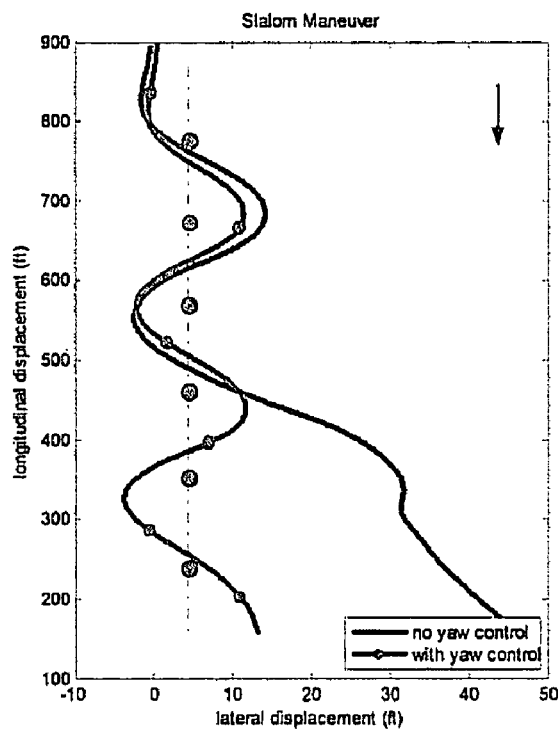
Figure 20:
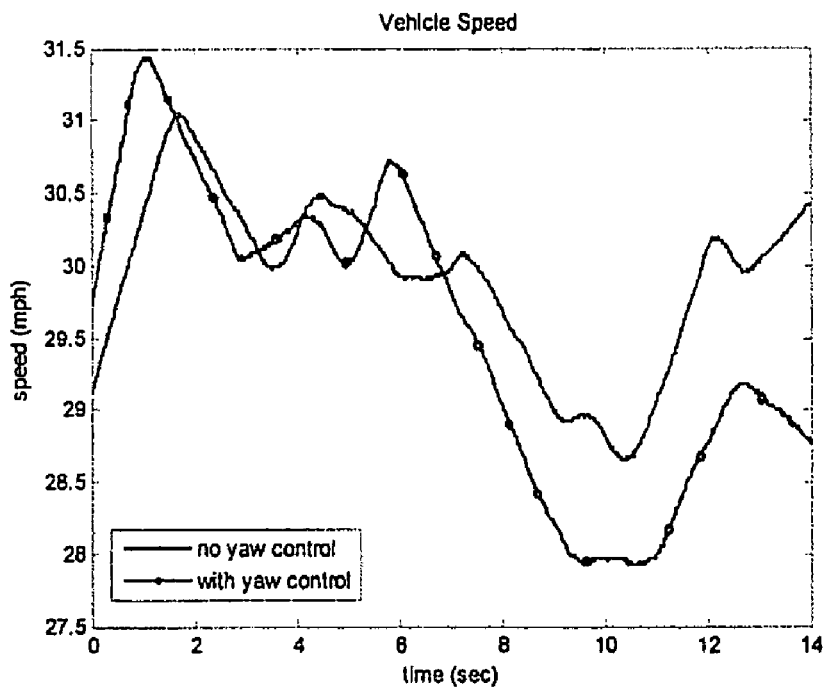
Figure 21:
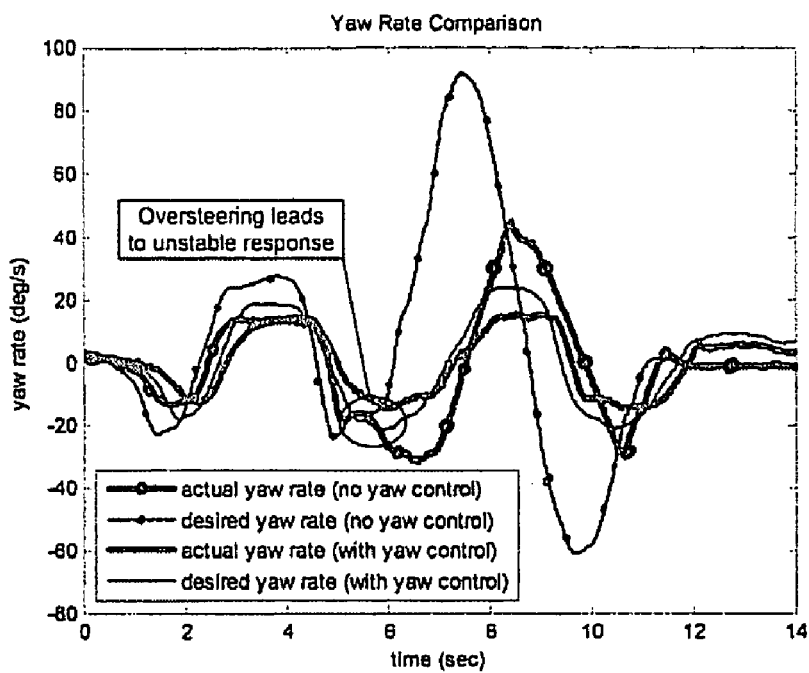
Figure 22:
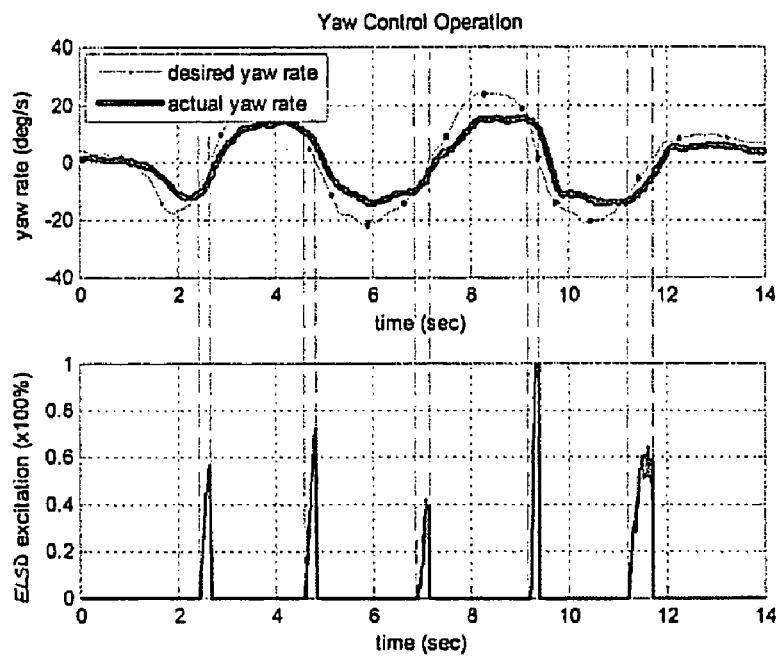

FIGS. 14-22 illustrate test results for the slalom maneuver when the handling limit was reached with and without constant velocity control using yaw damping controller 54. The vehicle with yaw damping controller 54 maintained its direction to follow the desired yaw rate while the vehicle without yaw damping controller 54 lost its stability and spun out off the track. A comparison of the vehicle longitudinal speed is also shown in FIGS. 16 and 20. The vehicle without control of yaw damping controller 54 shows an adverse speed performance due to vehicle spin. Using yaw damping controller 54, the differential was engaged when oversteering behavior was detected to add yaw damping, which made it easier for the driver to maintain the desired vehicle track.

Figure 23:
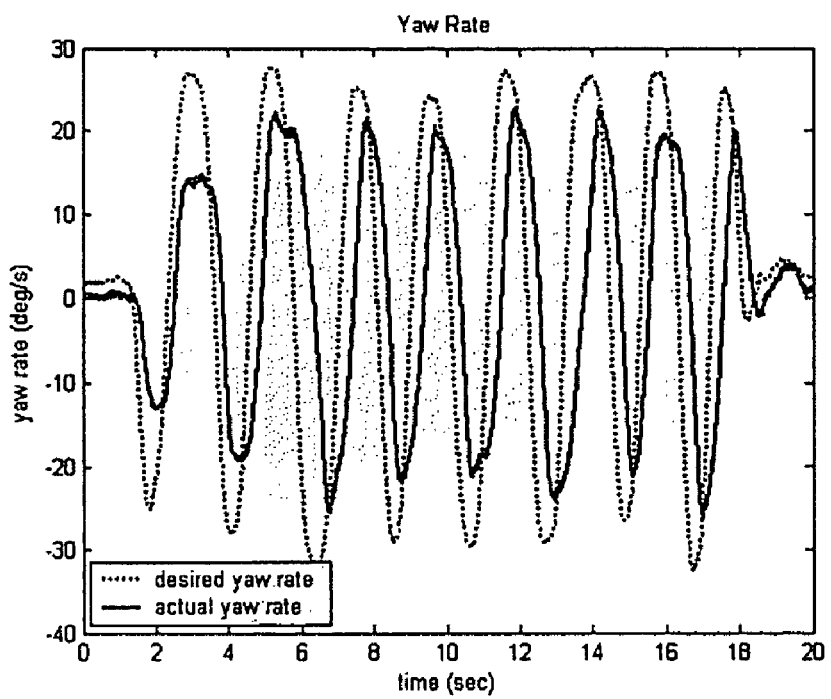
FIGS. 23 and 24 illustrate test results, in graphical format, of vehicle performance during an open-loop, sine-steer maneuver on a packed-snow road surface using a control system according to an embodiment of the present invention.
Figure 24:
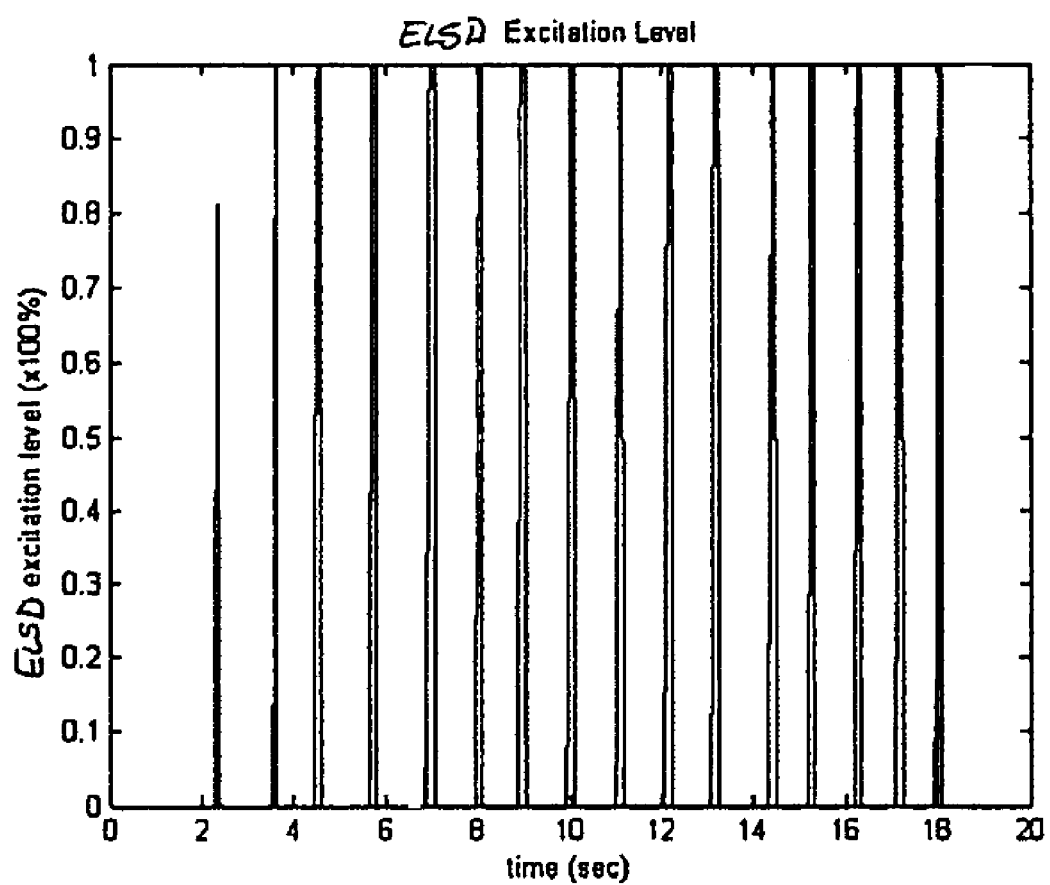

Referring to FIGS. 23 and 24, an open-loop sine-steer maneuver on a packed-snow road surface was performed to evaluate the handling characteristics with yaw damping controller 54. A driver drove the vehicle with a sine-shape steering angle at about 0.5 Hz with a constant speed control. The experimental results illustrated in FIGS. 23 and 24 show that the vehicle was under-steered most of the time, except from late mid-corner to the corner exit where the yaw damping controller 54 corrected the oversteer behavior.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A control system for a vehicle having first and second wheels, comprising:
    a differential apparatus adapted to distribute torque between the first and second wheels;
    a stability-enhanced traction controller for controlling operation of the differential apparatus from vehicle launch up to a predetermined vehicle speed, the traction controller configured to engage the differential apparatus in a first vehicle operating state according to at least one vehicle operating parameter indicative of a low traction operating condition and to further control engagement of the differential apparatus in a second vehicle operating state during the low traction operating condition according to a difference between an actual vehicle yaw rate and a predetermined target vehicle yaw rate; and
    a stability controller for controlling engagement of the differential apparatus at or above the predetermined vehicle speed;
    wherein the traction controller is configured to engage the differential apparatus according to a desired differential applied torque signal that is based on a modified original differential applied torque signal;
    wherein the desired differential applied torque signal is equal to the original differential applied torque signal multiplied by a modifier, the modifier including in its numerator the difference between an error range value and the multiplication of a saturation function, a deadband and the difference between the actual vehicle yaw rate and the predetermined target vehicle yaw rate, and the modifier including in its denominator the error range value.

2. The control system of claim 1, wherein the traction controller is configured to modulate engagement of the differential apparatus during the low traction operating condition according to a difference between the actual vehicle yaw rate and the predetermined target vehicle yaw rate.

3. The control system of claim 1, wherein in the first vehicle operating state, the actual vehicle yaw rate is less than or substantially equal to the predetermined target vehicle yaw rate, and in the second vehicle operating state, the actual vehicle yaw rate is greater than the predetermined target vehicle yaw rate.

* * * * *